US010097745B2

(12) United States Patent
Han et al.

(10) Patent No.: US 10,097,745 B2
(45) Date of Patent: Oct. 9, 2018

(54) HEAD ROTATION TRACKING DEVICE FOR VIDEO HIGHLIGHTS IDENTIFICATION (71) Applicant: Zepp Labs, Inc., Los Gatos, CA (US)

(72) Inventors: Zheng Han, Beijing (CN); Xiaowei Dai, Beijing (CN); Yusheng Ye, Beijing (CN)

(*) Notice: Subject to any disclaimer, the term of this patent is extended or adjusted under 35 U.S.C. 154(b) by 225 days.

(21) Appl. No.: 15/139,683

(22) Filed: Apr. 27, 2016

(65) Prior Publication Data
US 2017/0318214 A1 Nov. 2, 2017

(51) Int. Cl.
H04N 5/00 (2011.01)
H04N 5/232 (2006.01)
G06F 3/01 (2006.01)
G06K 9/00 (2006.01)

(52) U.S. Cl.
CPC ......... H04N 5/23203 (2013.01); G06F 3/012 (2013.01); G06K 9/00335 (2013.01); H04N 5/23219 (2013.01); H04N 5/23296 (2013.01)

(58) Field of Classification Search
CPC .................................. H04N 5/23203
USPC ....................................... 348/157
See application file for complete search history.

(56) References Cited

U.S. PATENT DOCUMENTS

| 5,610,590 | A | 3/1997 | Johnson et al. |
| 5,819,206 | A | 10/1998 | Horton et al. |
| 6,133,944 | A | 10/2000 | Braun et al. |
| 6,224,493 | B1 | 5/2001 | Lee et al. |
| 7,978,081 | B2 | 7/2011 | Shears et al. |
| 8,109,816 | B1 | 2/2012 | Grober |
| 8,135,183 | B2 * | 3/2012 | Hu ........................ G06F 3/012 348/169 |

(Continued)

FOREIGN PATENT DOCUMENTS

| KR | 20110102593 | 9/2011 |
| KR | 20130124422 | 11/2013 |

(Continued)

OTHER PUBLICATIONS

PCT International Search Report and Written Opinion for PCT/US2016/054540, dated Jan. 17, 2017, 14 Pages.

(Continued)

Primary Examiner — Dave Czekaj
Assistant Examiner — Shanika Brumfield
(74) Attorney, Agent, or Firm — Young Basile Hanlon & MacFarlane, P.C.

(57) ABSTRACT

A solution is disclosed for conveniently capturing video highlights in a sports event by tracking head rotation movement of a user and synchronizing rotations of a video capturing device (e.g., the user's mobile phone) on a rotary station with the head rotation movement of the user. The user wears a rotation tracking device, which tracks the head rotation movement of the user in connection with watching an event. The head rotation data from the user's head rotation movement is filtered to generate filtered head rotation data, which excludes noise motions in the head rotation data. Corresponding rotary control data is generated based on the filtered head rotation data. The rotary control data is used to instruct a rotary system to rotate synchronously with head rotations of the user when a video capturing device mounted on the rotary system captures videos of the sports event.

24 Claims, 5 Drawing Sheets

(56) References Cited

U.S. PATENT DOCUMENTS

| | | | |
|---|---|---|---|
| 8,282,487 B2 | 10/2012 | Wilson et al. | |
| 8,337,335 B2 | 12/2012 | Dugan | |
| 8,409,024 B2 | 4/2013 | Marty et al. | |
| 8,409,025 B2 | 4/2013 | Stites et al. | |
| 8,449,402 B2 | 5/2013 | Jaekel et al. | |
| 8,523,696 B2 | 9/2013 | Kamino et al. | |
| 8,589,114 B2 | 11/2013 | Papadourakis | |
| 8,593,286 B2 | 11/2013 | Razoumov et al. | |
| 8,903,521 B2 | 12/2014 | Goree et al. | |
| 8,905,855 B2 | 12/2014 | Fitzpatrick et al. | |
| 8,941,723 B2 | 1/2015 | Bentley et al. | |
| 8,944,928 B2 | 2/2015 | Kaps et al. | |
| 8,956,238 B2 | 2/2015 | Boyd et al. | |
| 9,039,527 B2 | 5/2015 | Bentley et al. | |
| 9,399,523 B2 * | 7/2016 | Burns | G01C 23/00 |
| 2005/0032582 A1 | 2/2005 | Mahajan et al. | |
| 2005/0272516 A1 | 12/2005 | Gobush | |
| 2006/0025229 A1 | 2/2006 | Mahajan et al. | |
| 2006/0119576 A1 * | 6/2006 | Richardson | G06F 3/012 345/156 |
| 2006/0166738 A1 | 7/2006 | Eyestone et al. | |
| 2008/0085778 A1 | 4/2008 | Dugan | |
| 2008/0136916 A1 * | 6/2008 | Wolff | G06F 3/012 345/158 |
| 2009/0048044 A1 | 2/2009 | Oleson et al. | |
| 2010/0103269 A1 | 4/2010 | Wilson et al. | |
| 2010/0144414 A1 | 6/2010 | Edis et al. | |
| 2010/0323794 A1 | 12/2010 | Su | |
| 2014/0313295 A1 * | 10/2014 | Dolim | H04N 13/0468 348/51 |
| 2016/0335483 A1 * | 11/2016 | Pfursich | G06K 9/00899 |

FOREIGN PATENT DOCUMENTS

| | | | | |
|---|---|---|---|---|
| KR | 1020130124422 A | * | 11/2013 | |
| WO | WO 2013158050 | | 10/2013 | |
| WO | WO 2013158050 A1 | * | 10/2013 | B64C 39/024 |

OTHER PUBLICATIONS

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.

Bishop, R., "LabVIEW 8 Student Edition," 2007, 12 pages, Pearson Prentice-Hall, Upper Saddle River, NJ.

First Annual "Better Golf Through Technology," Better Golf Through Technology Conference, Feb. 17-18, 2006, 1 page, [Archived on web.archive.org on Mar. 14, 2006] Can be Retrieved at <URL: https://web.archive.org/web/20060314063211/http:/www.bettergolfthroughtechnology.com/>.

Home Page For "Concept2: Training," 1 page, [Archived on web.archive.org on Feb. 5, 2009] Can be Retrieved at <URL:http://web.archive.org/web/20090205092657/http://concept2.com/us/training/default.asp>.

Home Page For Expresso.com, 2 pages, [Archived on web.archive.org on Apr. 29, 2009] Can be Retrieved at <URL:http://web.archive.org/web/20090426023759/http://expresso.com/products_services/index.html#>.

Honan, M., "Apple unveils iPhone," Macworld, Jan. 89, 2007, 4 Pages, can be retrieved at <URL:http://www.macworld.corn/article/1054769/iphone.html>.

InvenSense, "InvenSense™ Unveils World's 1st IMU Solution for Consumer Appl.s" InvenSense, Apr. 6, 2010, 2 pages.

Kalia, M., et al., "Efficient Policies for Increasing Capacity in Bluetooth: An Indoor Pico-Cellular Wireless System," IBM India Research Laboratory, 2000, 5 pages.

Linx Technologies, "HP3 Series Transmitter Module Data Guide" Linx Technologies, Inc., 2008, Revised Jul. 27, 2011, 13 Pages.

Otto, C., et al., "System Architecture of a Wireless Body Area Sensor Network for Ubiquitous Health Monitoring," Journal of Mobile Multimedia, 2006, pp. 307-326, vol. 1, No. 4.

Rao, R., et al., "Demand-based Bluetooth Scheduling," Pennsylvania State University, Sep. 27, 2001, 13 pages, Can be retrieved at <URL:http://www.cse.psu.edu/~gik2/papers/Bluetooth1.doc>.

Roving Networks, "Blue Sentry RN-8005-CB Data Sheet," 2009, 1 page.

Sanders, K., "Japanese Wii Price, Release Date Revealed," IGN US, Sep. 13, 2006, 1 Page, can be retrieved at <URL:http://www.ign.com/articles/2006/09/14/japanese-wii-price-release-date-revealed>.

Smartswing, "SmartSwing Introduces Affordable Intelligent Golf Club," Press Release, Jul. 19, 2005, 2 pages, [Archived on web.archive.org on Jun. 13, 2006] Can be Retrieved at <URL:https://web.archive.org/web/20060613114451/http://www.smartswinggolf.com/site/news/pr_2006_jan_23_aus.html>.

Solid State Technology, "MEMS Enable Smart Golf Clubs," Extension Media, Jan. 6, 2005, 3 pages,[Archived on web.archive.org on Jan. 15, 2016] Can be Retrieved at <URL:https://web.archive.org/web/20160115202844/http://electroiq.com/blog/2005/01/mems-enable-smart-golf-clubs/>.

Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.

The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.

The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.

The iClub System™ "iClub.net— Products ICLUB$^e$," Fortescue Corp. 2001-2005, 1 Page, [Archived on web.archive.org on Apr. 14, 2005] Can be Retrieved at <URL: https://web.archive.org/web/20050414233840/http://www.iclub.net/products-iclube.html.

The iClub System™ "iClub.net—Products ICLUB (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.

The iClub Product Brochure, 2001-2005, 2 pages.

Tuite, D., "Motion-Sensing MEMS Gyros and Accelerometers Are Everywhere," Electronic Design, Jul., 9, 2009, 6 pages, Can be retrieved from <URL:http://electronicdesign.com/analog/motion-sensing-mems-gyros-and-accelerometers-are-everywhere>.

Webster's New College Dictionary, Definition for "Virtual Reality," (3rd ed. 2008), 3 Pages.

Webpage for zigbees.com, 4 Pages, [online] [retrieved on Mar. 14, 2016] Can be retrieved at <URL:http://www.zigbees.com/h_start.htm>.

Wheeler, A, et al., "Introduction to Engineering Experimentation," 2nd Edition, 2004, Chapter 4, 10 pages, Pearson—Prentice-Hall, Upper Saddle River, NJ.

Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.

Affidavit of Christopher Butler dated Jan. 25, 2016 regarding "SmartWing Intelligent Clubs," 46 Pages, [Archived on web.archive.org on Apr. 11, 2006] Can be Retrieved at <URL:https://web.archive.org/web/20060411113841/http://www.smartswinggolf.com/site/>.

Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/default.asp>.

(56) References Cited

OTHER PUBLICATIONS

Certified File History of U.S. Pat. No. 8,905,855, Feb. 2, 2016, 709 Pages.
Certified File History of U.S. Pat. No. 8,941,723, Feb. 2, 2016, 929 Pages.
File History of U.S. Pat. No. 8,903,521, 2015, 406 pages.
Certified File History of U.S. Pat. No. 8,944,928, Feb. 2, 2016, 647 Pages.
Certified File History of U.S. Pat. No. 9,039,527, Feb. 2, 2016, 1047 Pages.
Declaration of Dr. Steven M. Nesbit, U.S. Pat. No. 8,905,855, Feb. 24, 2016, 235 Pages.
Declaration of Dr. Steven M. Nesbit, U.S. Pat. No. 8,941,723, Feb. 24, 2016, 219 Pages.
Declaration of Dr. Steven M. Nesbit, U.S. Pat. No. 8,903,521, Feb. 24, 2016, 250 Pages.
Declaration of Dr. Steven M. Nesbit, U.S. Pat. No. 8,944,928, Feb. 24, 2016, 195 Pages.
Declaration of Dr. Steven M. Nesbit, U.S. Pat. No. 9,039,527, Feb. 24, 2016, 227 Pages.
Curriculum Vitae of Dr. Steven M. Nesbit, Feb. 24, 2016, 10 pages.
Claim Limitation Reference Nos. '855 Petition, Feb. 24, 2016, 6 pages.
Claim Limitation Reference Nos. '723 Petition, Feb. 24, 2016, 5 pages.
Claim Limitation Reference Nos. '521 Petition, Feb. 24, 2016, 4 pages.
Claim Limitation Reference Nos. '928 Petition, Feb. 24, 2016, 3 pages.
Claim Limitation Reference Nos. '527 Petition, Feb. 24, 2016, 4 pages.

* cited by examiner

FIG. 5

HEAD ROTATION TRACKING DEVICE FOR VIDEO HIGHLIGHTS IDENTIFICATION

BACKGROUND

This disclosure relates generally to digital content processing and particularly to capturing video highlights in sports videos by tracking a viewer's head rotation movement and synchronizing a video capturing device (e.g., a mobile phone) on a rotary station with the viewer's head rotation movement.

With the advancement of mobile computing devices such as smart phones and tablets, more and more people are able to record videos of various types of events, such as recording sports videos and sharing video highlights in the recorded sports videos with others. A video highlight of a sports video is a portion of the sports video and represents a semantically important event captured in the sports video (e.g., a short video clip capturing goals or goal attempts in a soccer game video).

Steadily recording a long sports event by a viewer using his/her smart phone and tablet can be challenging. One of the challenges is from the difficulty of capturing rapid movements in a sports event over a large sports field. For soccer, basketball, baseball, hockey and other similar sports, the sports field is typically very large and players spread out across the large sports field. Thus, viewers/audiences of the sports event have to frequently turn their heads to track the players' activities during the sports game/event. Another challenge is to predict when a video highlight is to happen in a live event. Thus, in order to capture an unpredictable video highlight in a sports game/event or a live event, a viewer has to stay alert for the whole sports game/event, which can be tiring, frustrating for missing the highlights of the sports game/event, and degrading the joy of watching the sports game/event.

SUMMARY

Embodiments of the disclosure provide a solution for conveniently capturing video highlights in a sports event by tracking head rotation movement of a user and synchronizing rotation of a video capturing device (e.g. a mobile phone) on a rotary station with the head rotation movement of the user. A control module of a rotary station receives from a rotation tracking device worn by the user head rotation data of the user in connection with watching an event. The control module filters out noise motions in the received head rotation data and generates filtered head rotation data. The control module also generates corresponding rotary control data based on the filtered head rotation data. The control module instructs a rotary system of the rotary station to rotate synchronously with head rotations of the user based on the rotary control data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

I. Environment Overview

A solution is provided to conveniently capture video highlights in a sports event by tracking head rotation movement of a user and synchronizing rotations of a video capturing device (e.g., a mobile phone) on a rotary station with the head rotation movement of the user. The user wears a tracking device (e.g., a rotation tracking device with one or more motion sensors) on a part of his/her body (e.g., head, a cap on his/her head) while watching the sports event. The tracking device tracks head movement of the user (e.g., the rotation of the head in a horizontal plane). Motion data describing the head rotation movement of the user is transmitted to the rotary station, and processed to generate commands to drive the video capturing device (e.g., a mobile phone) mounted on the rotary station, to follow the head rotation movement of the user. The user uses a remote control to activate the video capturing device mounted on the rotary station to capture a video clip of the sports event, which is of interest to the user. With the tracking device tracking the head rotation movement of the user, the video capturing device mounted on the rotary station keeps following the view of the user during the sports event. The captured video of the sports event is analyzed to identify one or more video highlights in the sports event. The user is free from constantly checking whether the video capturing device captures what he/she wants; instead, the user can focus on the sports event and enjoying it.

In this disclosure, "digital content" generally refers to any machine-readable and machine-storable work. Digital content can include, for example, a combination of video and audio. Alternatively, digital content can be a still image. For purposes of simplicity and the description of one embodiment, the digital content will be referred to as a "video" but no limitation on the type of digital content that can be analyzed are intended by this terminology.

Figure 1:
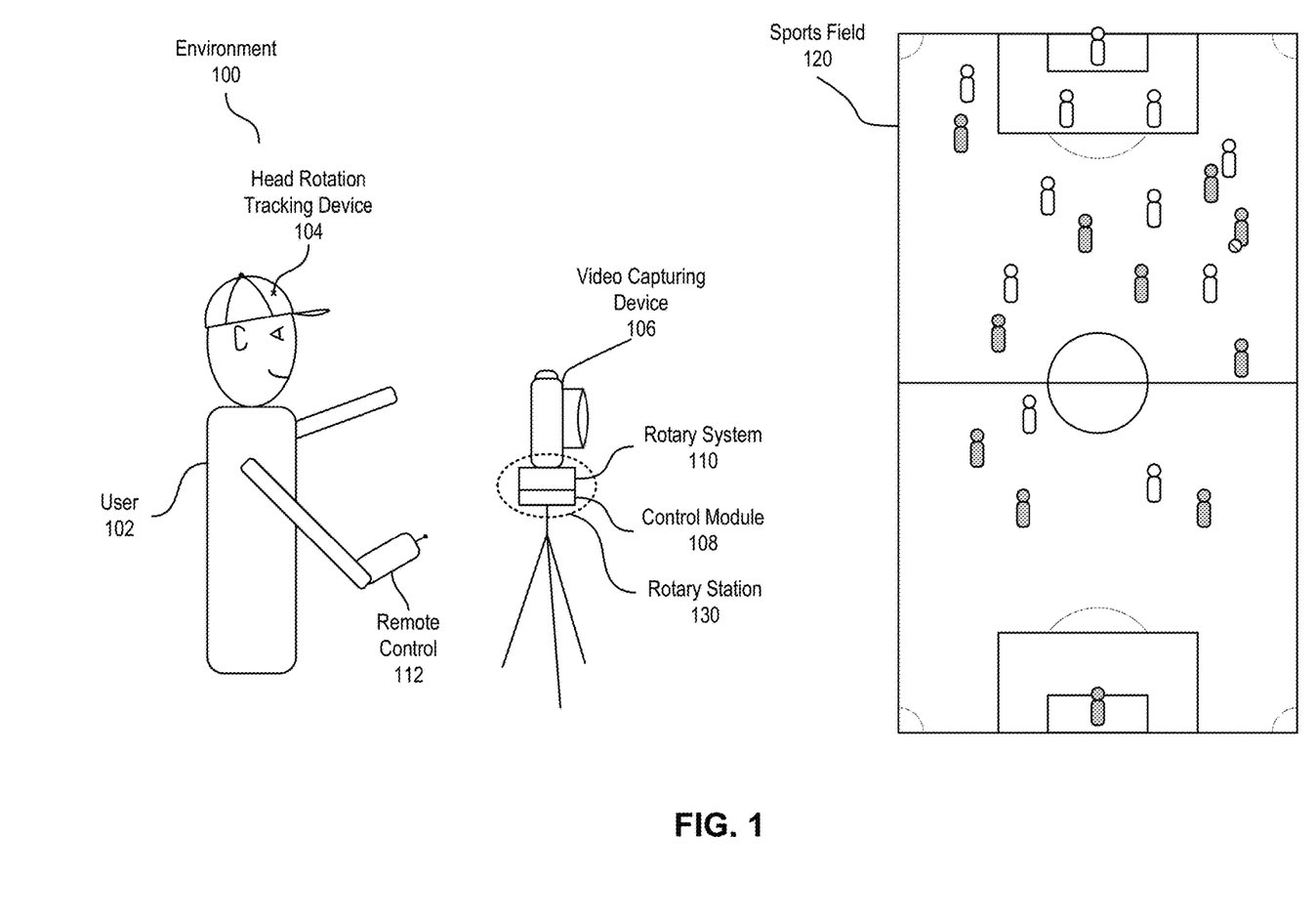
FIG. 1 is a block diagram of an environment for tracking a user's head rotation movement and synchronizing a video capturing device (e.g. a mobile phone) connected to a rotary station with the head rotation movement of the user during a sports event, according to one embodiment.

FIG. 1 is a block diagram of an environment 100 for tracking head rotation movement of a user and synchronizing a video capturing device connected to a rotary station 130 with the head rotation movement of the user during a sports event, according to one embodiment. The embodiment illustrated in FIG. 1 includes a user 102 wearing a head rotation tracking device 104 on his/her cap, a video capturing device 106 (e.g., a mobile phone of the user 102), a remote control 112 used by the user 102 to control the video capturing device 106 mounted on a rotary station 130, which includes a control module 108 and a rotary system 110. The user 102 watches a sports event happening on a sports field 120 and controls the video capturing device 106 to capture one or more videos of the sports event. The functions performed by the various entities of FIG. 1 may differ in different embodiments. Each of these entities includes computing devices that may be physically remote from each other but which are communicatively coupled by a computer network. The computer network is typically the Internet, but can be any network(s), including but not limited to a LAN, a MAN, a WAN, a mobile wired or wireless network, a cloud network, a private network, a virtual private network, a Bluetooth or Bluetooth Low Energy (BLE) wireless network, a point-to-point network, or a combination thereof. In some configurations, the entities use custom and/or dedicated communications technologies to communicate.

The user 102 follows activities occurring on the sports field 120. For example, the user 102 follows ball movement, player movement, and/or other actions occurring on the sports field 120 or in the near vicinity of the sports field 120, such as on the sidelines of the sports field 120. The user 102 follows activities occurring on the sports field 120 by rotating his/her head left or right horizontally or moving his/her head up and down vertically (e.g., nodding). The head movement of the user 102 along a horizontal axis in a three-dimensional (3D) navigation system is also referred to as a "yaw rotation" or "rotation." The head movement of the user 102 along a vertical axis in the 3D navigation system is also referred to as a "pitch." For simplicity, only yaw rotation of the head of the user 102 is analyzed herein with various embodiments, but no limitation on the type of head movement of the user that can be analyzed are intended.

In the embodiment shown in FIG. 1, the user 102 wears the head rotation tracking device 104 (also referred to as "tracking device 104") on his/her cap, which tracks the head rotation movement of the user 102 in connection with watching the sports activities in the sports field 120. In one embodiment, the tracking device 104 includes one or more small sized sensors, which can be worn on the user's head, baseball cap/hat, ear or other part of the user's head. The tracking device 104 is further described with reference to FIG. 2. Head rotation data of the user is transmitted to the control module 108 of the rotary station 130 to control the rotary system 110 to follow the head rotation of the user 102 in a synchronized way.

The user 102 uses a remote control 112 to control the video capturing device 106 mounted on the rotary station 130, such as turning on and off the video capturing device 106 during a video capturing process. In one embodiment, the remote control 112 is an electronic device used by the user 102 to perform functions such as, activating the video capturing device 106 to capture a video clip of a sports event happening on the sports field 120. The remote control 112 can have a user interface (UI), such as physical buttons, with which the user 102 may interact with the remote control 112. Examples of the remote control 112 include conventional electronic remote control devices and modern consumer electronic devices such as smart watches. The remote control 112 is communicatively coupled to the video capturing device 106 via a wire or wirelessly.

The video capturing device 106 is an electronic device used by the user 102 to capture digital content such as recoding a video clip of a sports event happening on the sports field 120. In one embodiment, the video capturing device 106 is a mobile phone of the user 102 and includes an image capturing device and a transmitter for transmitting the captured digital content. The video capturing device 106 can be, for example, a smart phone (e.g., the mobile phone of the user 102), a tablet, a digital single-lens reflex camera (DSLR), or any other suitable user device or computing device for capturing digital content. For simplicity, the various electronic devices that are capable of capturing digital content are generally referred to as the video capturing device 106. The video capturing device 106 can be remotely triggered by the remote control 112 to capture digital content. In some configurations, the video capturing device 106 captures digital content for a predetermined period of time (e.g., 30 seconds). In other configurations, the video capturing device 106 begins capturing digital content when remotely triggered by the remote control 112 and ends capturing digital content when again remotely triggered by the remote control 112. The video capturing device 106 can transmit the captured digital content to a cloud storage service. The video capturing device 106 is mounted on or otherwise connected to the rotary station 130. In other embodiments, the video capturing device 106 and the mobile device of the user 102 can be two separate entities.

The user 102 uses a mobile device as a video capturing device to record video clips of a sports event and to consume digital content, such as the recorded video clips or highlights thereof. For example, the user 102 uses the mobile device to perform functions such as, consuming video clip(s) captured by the video capturing device 106, and video highlights generated from the captured video clip(s). The mobile device of the user 102 can be a smart phone, a tablet, or any other suitable user device or computing device for consuming video clip(s). In addition, the mobile device of the user 102 provides a user interface, such as physical and/or on-screen buttons, with which the user 102 may interact with the mobile device to perform functions such as viewing, sharing, and/or otherwise consuming the video clip(s).

The rotary station 130 is configured to drive a video capturing device 106 (e.g., a mobile phone of the user 102 having a digital camera) mounted on the rotary station 130 to follow the head rotations of the user 102 based on commands generated from the head rotation data captured by the tracking device 104. In the embodiment shown in FIG. 1, the rotary station 130 has the control module 108 for receiving the head rotation data of the user 102 from the tracking device 104, processing the head rotation data to generate rotary control data (e.g., rotary movement commands and instructions), and transmitting the rotary control data to the rotary system 110. The rotary system 110 receives the rotary control data, and executes one or more commands based on the instructions to rotate the video capturing device 106 mounted on the rotary station 130 in synchronization with the head rotation movement of the user 102. The control module 108 and the rotary system 110 are communicatively coupled to one another. The rotary station 130 is further described with respect to FIG. 2.

II. Example Computing System Architecture

Figure 2:
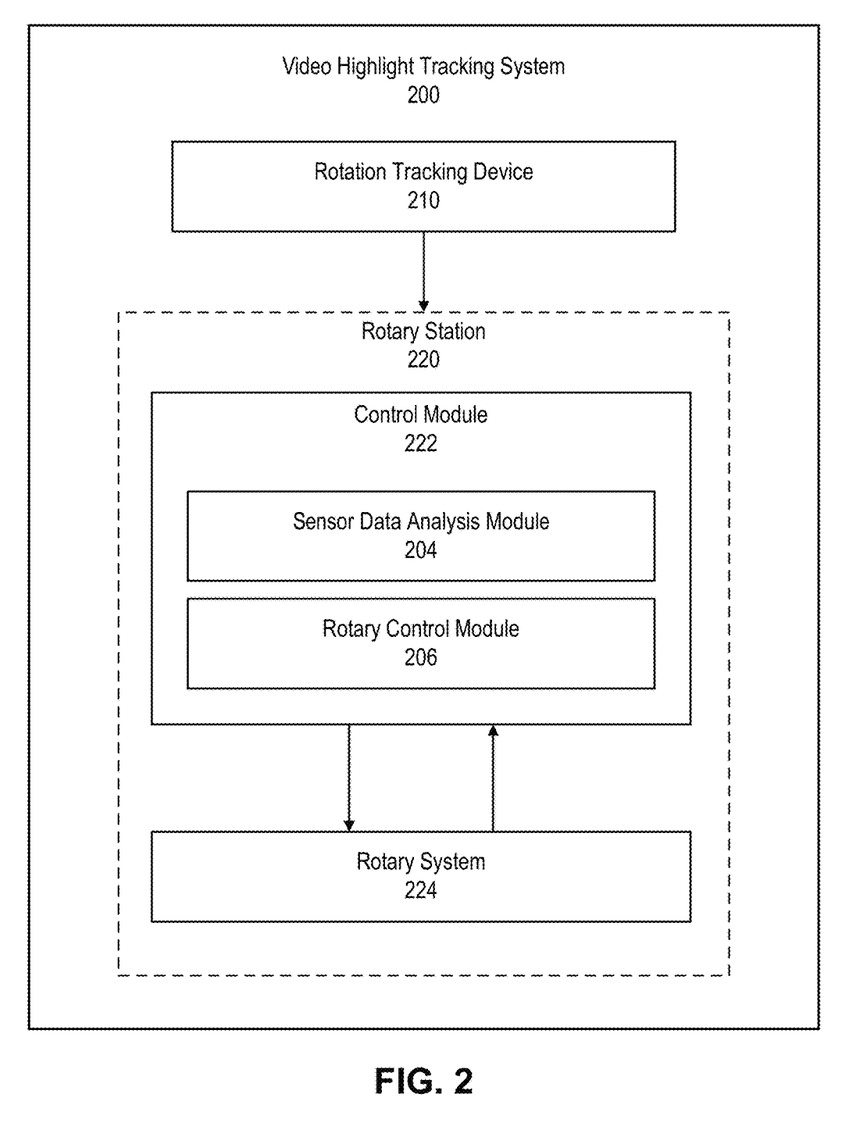
FIG. 2 is a block diagram of a video highlight tracking system for synchronizing rotations of a video capturing device (e.g., a mobile phone) on a rotary station with head rotations of a user, according to one embodiment.

FIG. 2 is a block diagram of a video highlight tracking system 200 for synchronizing rotations of a video capturing device (e.g., the video capturing device 106 as shown in FIG. 1) on a rotary station (e.g., the rotary system 110 as shown in FIG. 1) with head rotations of a user (e.g., the user 102 as shown in FIG. 1), according to one embodiment. In the embodiment shown in FIG. 2, the video highlight tracking system 200 (also referred to as "tracking system 200") includes a rotation tracking device 210 (e.g., the head rotation tracking device 104 shown in FIG. 1) and a rotary station 220 (e.g., the rotary station 130 shown in FIG. 1). The rotary station 220 includes a control module 222 (e.g., the control module 108 shown in FIG. 1) and a rotary system 224 (e.g., the rotary system 110 shown in FIG. 1). The control module 222 includes a sensor data analysis module 204 (also referred to as "analysis module 204") and rotary control module 206. In other embodiments, the tracking system 200 may include additional and/or different modules, such as a remote control 112 used by the user 102 shown in FIG. 1.

The rotation tracking device 210 tracks head movement of a user (e.g., the user 102 as shown in FIG. 1) in connection with the user watching an event (e.g., a sports game). In one embodiment, the head movement of the user includes yaw rotations of the head of the user (e.g., user rotating his/her head left and right along the horizontal view of the eyes of the user). Other embodiments include pitch movement of the head of the user (e.g., user nodding up and down) or both yaw rotations and pitch movement of the head of the user.

In one embodiment, the rotation tracking device 210 includes one or more small sized sensors, which can be worn on the user's head, baseball cap/hat, ear or other part of the head of the user. The sensors of the rotation tracking device 210 tracks the head rotation of the user in connection with the user watching the sports game and transmit the captured head rotation data to the control module 222 via a transmitter. For example, the rotation tracking device 210 can include an inertial magnetic unit (IMU), which can include one or more sensors such as 3-axis electronic compasses, gyroscopes, 3-axis accelerometers, among other devices for capturing motion data representative of movement of the head of the user. The rotation tracking device 210 continually tracks head rotations of a user in real-time in connection with the user watching sports game. In some configurations, the rotation tracking device 210 transmits the head rotation data wirelessly via a Bluetooth module to the control module 222 of the rotary station 220 continually as the head rotation data is captured. In other configurations, the rotation tracking device 210 transmits the head rotation data to the control module 222 periodically (e.g., every 10 seconds).

The rotary station 220 includes the control module 222 and the rotary system 224. The control module 222 receives the head rotation data of a user from the rotation tracking device 210, processes the head rotation data to generate rotary control data, and transmits the rotary control data to the rotary system 224. In the embodiment shown in FIG. 2, the control module 222 includes the sensor data analysis module 204 (also referred to as "analysis module 204") and the rotary control module 206. The analysis module 204 receives the head rotation data of a user from the rotation tracking device 210, processes the received head rotation data to generate analyzed head rotation data, and transmits the analyzed head rotation data to the rotary control module 206. The rotary control module 206 generates rotary control data based on the analyzed head rotation data, and transmits the rotary control data to the rotary system 224. The rotary control data includes instructions for calibrating the rotary system 224 with the rotation tracking device 210 (e.g., by aligning the rotation of a rotary DC motor of the rotary system 224 with the head rotations of the user) and instructions for driving a motor gear of the rotary system 224 to rotate a video capturing device (not shown) mounted on the rotary system 224 to follow the head rotations of the user in a synchronized fashion. The analysis module 204 and the rotary control module 206 are further described with reference to FIGS. 3 and 4, respectively. In alternative configurations, different or additional components can be used. For example, in an alternative embodiment, the analysis module 204 is included as an entity of the rotation tracking device 210 and the rotary control module 206 is included as an entity of the rotary system 224.

The rotary system 224 receives the rotary control data from the rotary control module 206, and rotates a video capturing device mounted on the rotary system 224 to follow the head rotations of the user in a synchronized fashion. The rotary system 224 transmits feedback data to the rotary control module 206 for adjusting the rotary control data for subsequent rotations to be performed by the rotary system 224.

In one embodiment, the rotary system 224 includes a transceiver (e.g., a Bluetooth module), a rotary DC motor with a motor gear and an encoder, a motor controller, a driver and one or more mechanical components. The transceiver receives the rotary control data from the rotary control module 206 and transmits feedback data to the rotary control module 206. The motor gear amplifies the rotary DC motor's torque to enable the motor to drive rotation of the rotary system 224. The encoder measures the rotation of the motor, where the measurement of the rotation of the motor can be used as feedback data for controlling subsequent rotations of the motor. The motor controller interprets the received instructions in the rotary control data and executes the one or more commands included in the instructions to control the position and speed of the rotary system 224. The motor driver drives the DC motor directly with controllable voltage for speed and position control of the rotary system 224.

One of the mechanical components of the rotary system 224 includes an end effector to mount a video capturing device onto the rotary system 224. The rotary system 224 also includes two or more mechanical limit switches, which define a rotation region of the end effector. The rotation region of the end effector is also referred to as the workspace of the end effector. A limit switch is triggered when the end effector reaches a boundary of the workspace of the end effect such that the motor of the rotary system 224 should stop rotating further.

In one embodiment, the encoder is used to measure the relative position of the end effector of the rotary system 224. The two limit switches can act as a baseline for the position of the end effector. A middle point, $\Phi$, of the two limit switches, $[-\psi, \psi]$, is defined as the original point of the end effector's workspace, which is represented as $\Phi=[-\psi, \psi]$ in a rotary station coordinate used by the rotary system 224. On the other hand, the head rotation data analyzed by the analysis module 204 is in a different coordinate system (e.g., geomagnetic coordinate system). When the tracking system 200 is set up at its configuration stage, a calibration process is performed (e.g., by the rotary control module 206) to align the rotation of the end effector with the head rotation of the user. The calibration process is further explained with reference to the calibration module 402 in FIG. 4.

III. Example Sensor Data Analysis Module

Figure 3:
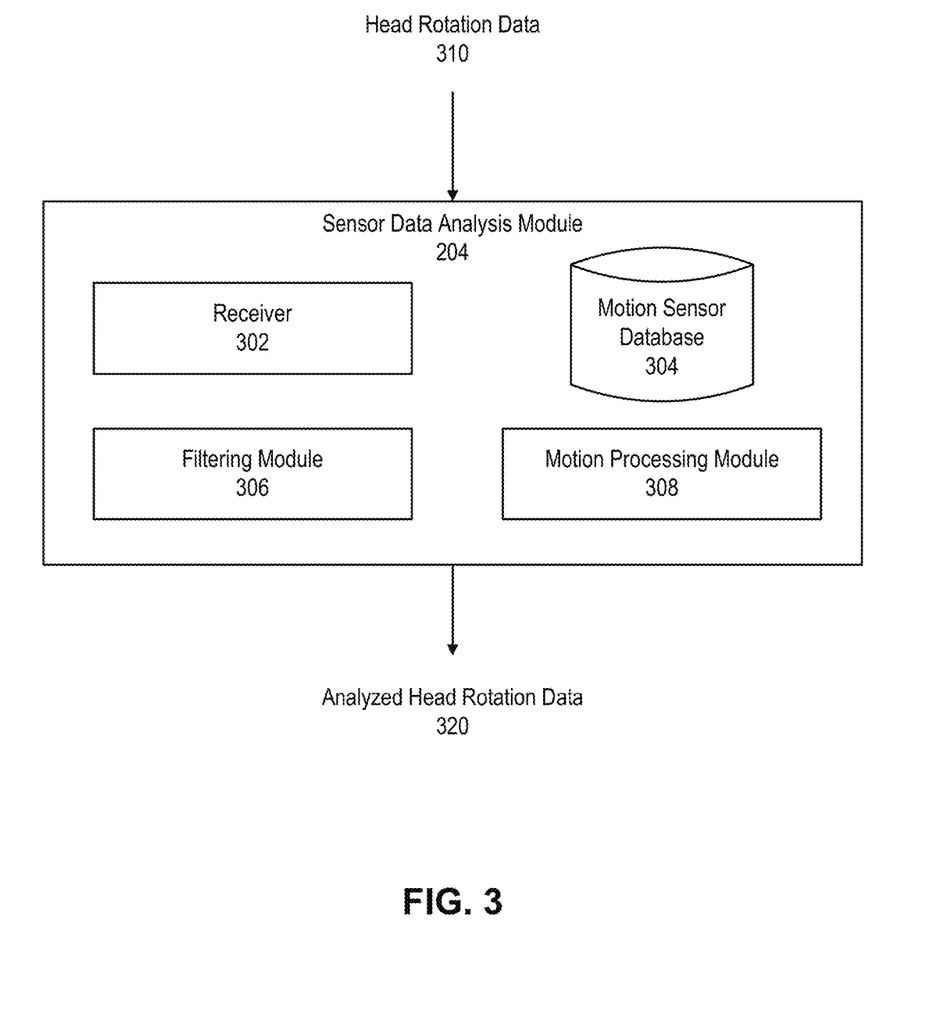
FIG. 3 is a flow diagram of a sensor data analysis module of a control module of a rotary station, according to one embodiment.

FIG. 3 is a flow diagram including the sensor data analysis module 204 of the control module 222 of the rotary station 220, according to one embodiment. The analysis module 204 receives head rotation data of a user from the rotation tracking device 210, processes the received head rotation data to generate analyzed head rotation data, and outputs the analyzed head rotation data to the rotary control module 206 of the control module 222. In the embodiment shown in FIG. 3, the analysis module 204 includes a receiver 302, a motion sensor database 304, a filtering module 306, and a motion processing module 308. In alternative configurations, different or additional components can be used. For example, the filtering module 306 can be included in the rotation tracking device 210 to filter noise motions from the tracked head rotation of the user.

The receiver 302 receives head rotation data 310 from the rotation tracking device 210 and stores the received head rotation data in the motion sensor database 304. In some configurations, the motion sensor database 304 further stores filtered head rotation data output from the filtering module 306 and/or analyzed head rotation data 320 output from the motion processing module 308.

The filtering module 306 filters the received head rotation data to filter out noise motions in the received head rotation data to generate filtered head rotation data, and stores the filtered head rotation data at the motion sensor database 304. The noise motions in the received head rotation data in connection with the user watching a sports event refer to the motion data, which are likely to cause jilter when used to control the rotary station 220 to capture a video clip of the sports event. When a user watches a sports event, the user is very likely to turn his/her head around randomly. For example, the eye view of the user may be off a sports field (e.g., the sports field 120 shown in FIG. 1) when he/she talks with friends nearby, or checking out activities of other spectators in the stands. Motions related to the user shaking his/her head or chewing gum while watching the sports event are also noise motions when used in synchronizing the rotation of the rotary system 224. The filtering module 306 filters the received head rotation data by implementing one or more filtering techniques known to those of ordinary skill in the art, such as, low-pass filtering, high-pass filtering, complementary filtering, and Kalman filtering.

In one embodiment, the filtering module 306 first selects a proper filter (e.g., a low-pass filter) based on the sampling rate of processing the received head rotation data including the noise motions. The filtering module 306 filters the noise motions in the received head rotation data (e.g., using a fixed length sliding window buffer of a predetermined length to store the received head rotation data). At each sampling point, the varying patterns of the head rotation data stored in the sliding window buffer are checked. If the received head rotation data varies linearly, the filtered head rotation data at the sampling point is the received head rotation data regressed by linear regression. If the received head rotation data varies nonlinearly, the filtered head rotation data at the sampling point is the median of the received head rotation data in the fixed length sliding window buffer. By using a fixed length sliding window buffer and checking varying patterns of the received head rotation data at each sampling point, the filtering module 306 is able to quickly and accurately filter the received head rotation data of the user. To limit the received head rotation data within a range that is suitable for controlling the rotation of the rotary system 224, the filtering module 306 compares the filtered head rotation data with a predetermined threshold value θ, which can be set during the calibration process or set to a default value.

The motion processing module 308 processes the filtered head rotation data to generate analyzed head rotation data, and stores the analyzed head rotation data at the motion sensor database 304. In one embodiment, the analyzed head rotation data includes a data structure, which accurately describes the head movement of the user being tracked by the rotation tracking device 210, associated timing information and any other information, which can be used to calibrate and control the rotation of the rotary system 224 (e.g., information describing the various sensors of the head rotation tracking device 210). In one embodiment, the analyzed head rotation data further includes a rotation tracking device direction relative to a rotation tracking device direction in the calibration process in a horizontal plane. The rotation tracking device direction in the horizontal plane is also referred to as yaw.

IV. Example Rotary Control Module

Figure 4:
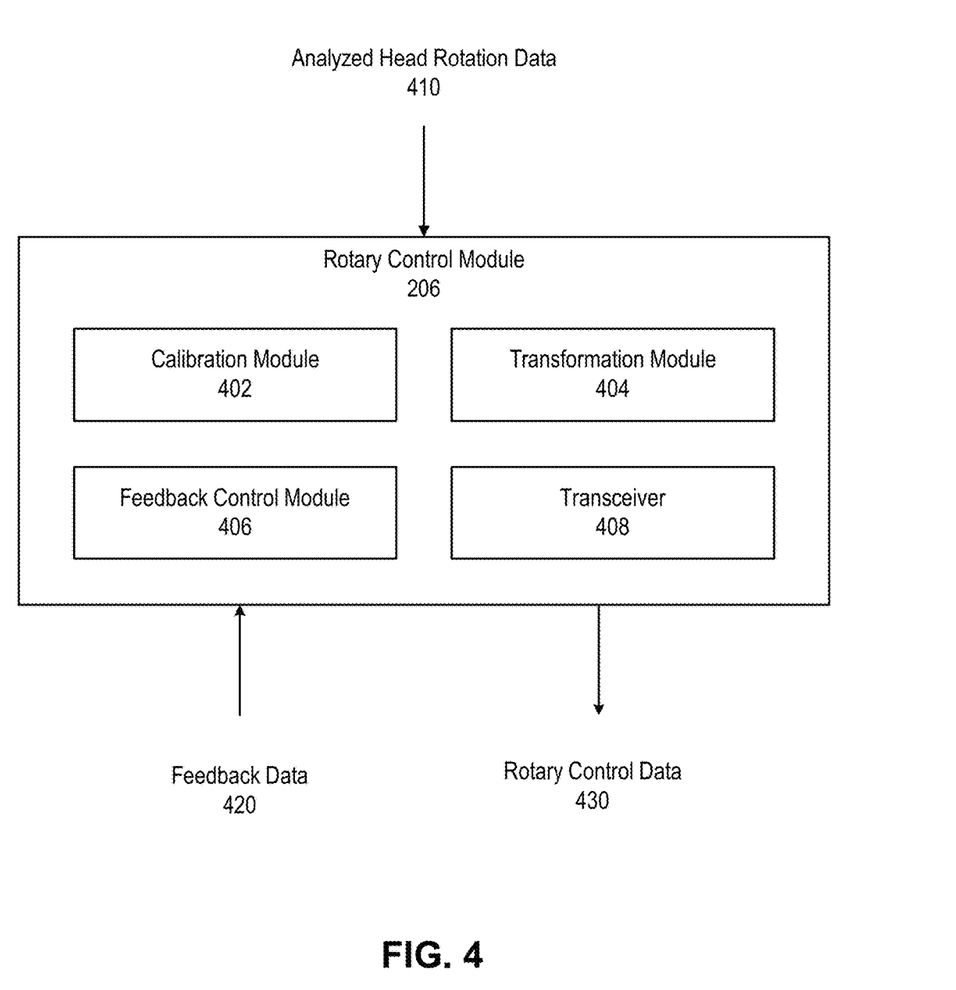
FIG. 4 is a flow diagram of a rotatory control module of a control module of a rotary station, according to one embodiment.

FIG. 4 is a flow diagram of the rotary control module 206 of the control module 222 of the rotary station 220, according to one embodiment. The rotary control module 206 receives analyzed head rotation data 410 from the analysis module 204, generates rotary control data based on the received analyzed head rotation data, and controls the rotary system 224 to rotate in synchronization with the head rotations of the user. In the embodiment shown in FIG. 4, the rotary control module 206 includes a calibration module 402, a transformation module 404, a feedback control module 406, and a transceiver 408. In alternative configurations, different or additional components can be used.

The calibration module 402 calibrates the rotary system 224 with the rotation tracking device 210, which generates the head rotation data of a user (e.g., the user 102) wearing the rotation tracking device 210. In one embodiment, the rotary system 224 has a calibration button for initiating and stopping a calibration process, and a mark line to indicate which direction the user should face his/her head during calibration. As described earlier, the head rotation being tracked by the rotation tracking device 210 can be in a coordinate system different from the coordinate system used by the rotary system 224 (e.g., geomagnetic coordinate system vs. rotary station coordinate system). Thus, when the tracking system 200 initiates, the head rotation measured in the geomagnetic coordinate needs to be aligned with the rotation of the end effector of the rotary system 224.

In one embodiment, the calibration module 402 performs a calibration process as follows: (1) the calibration module 402 instructs the rotation tracking device 210 to point its rotation tracking sensor to the middle of a sports field (e.g., the sports field 120 shown in FIG. 1) and keep it still for a predefined period of time (e.g., 10 seconds); (2) the calibration module 402 instructs the end effector to rotate towards the first limit switch at a fixed rotation speed until it triggers the first limit switch; (3) the calibration module 402 instructs the end effector to rotate towards the second limit switch at a fixed rotation speed until it triggers the second limit switch; and (4) the calibration module 402 instructs the end effector to rotate towards the middle point between the first limit switch and the second limit switch and stays there for a predetermined of period of time. In one embodiment, the calibration process is started manually by the user who wears the rotation tracking device 210. If the user wants to set the threshold value θ, the user can manually rotate the end effector to the position indicated by the threshold value θ; otherwise, the threshold value θ is set to a default value ψ (i.e., θ=ψ).

The transformation module 404 receives the analyzed head rotation data 410 from the analysis module 204, and generates rotary control data based on the received head rotation data. The rotary control data includes instructions or commands, which instruct the rotary system 224 to rotate its end effector in synchronization with the head rotation of the user. In other words, the rotary system 224 synchronously follows the head rotations of the user. For example, as the user rotates his/her head θ degrees to the left side, the rotary system 224 will also rotate θ degrees to the left side.

In one embodiment, the transformation module 404 generates rotary control data in connection with the rotation region boundaries of the end effector of the rotary system 224. For example, the transformation module 404 determines whether rotating a current angle of the end effector by following corresponding head rotation would keep the video capturing device mounted by the end effector to the rotary system 224 within the rotation region boundaries of the end effector. If the rotation by the rotary system 224 is beyond the rotation region boundaries, the transformation module 404 generates instructions to instruct the rotary system 224 to stop rotating and to record the actual rotation performed by the rotary system 224 for feedback purposes.

Upon receiving the feedback data from the feedback control module 406, the transformation module 404 updates the rotation control data for subsequent rotations by the rotary system 224. For example, the rotation command for a current rotation being performed by the rotary system 224 can be 20 degrees to the left side, but the rotary system 224 can have rotated only 15 degrees to the left side. The rotary system 224 provides the current rotation (i.e., 15 degrees to the left) to the transformation module 404 through the feedback control module 406. The transformation module 404 adjusts the rotation control data for next rotation point based on the actual rotation performed for the current point. For example, if the rotation command for the next rotation point without the feedback data for the current rotation point is 10 degrees to the left side, the adjusted rotation command for the next rotation point is 15 degrees to the left side (assuming the rotary system 224 is still within the rotation region boundary when executing the rotation command for the next rotation point).

The feedback control module 404 measures the actual rotation performed by the rotary system 224 for each rotation point and provides the actual rotation as feedback data for each rotation point to the transformation module 404 for rotation control data adjustment. Alternatively, the feedback control module 404 calculates a difference between the actual rotation performed by the rotary system 224 and expected rotation (i.e., the corresponding head rotation of the user) for each rotation point provides the difference as the feedback data to the transformation module 404 for rotation control data adjustment.

The transceiver 408 transmits the rotary control data 430 generated by the transformation module 404 to the rotary system 224. The transceiver 708 receives feedback data 420 from the feedback control module 406 and transmits the feedback data to the transformation module 404 for adjusting rotary control data for subsequent rotations.

Figure 5:
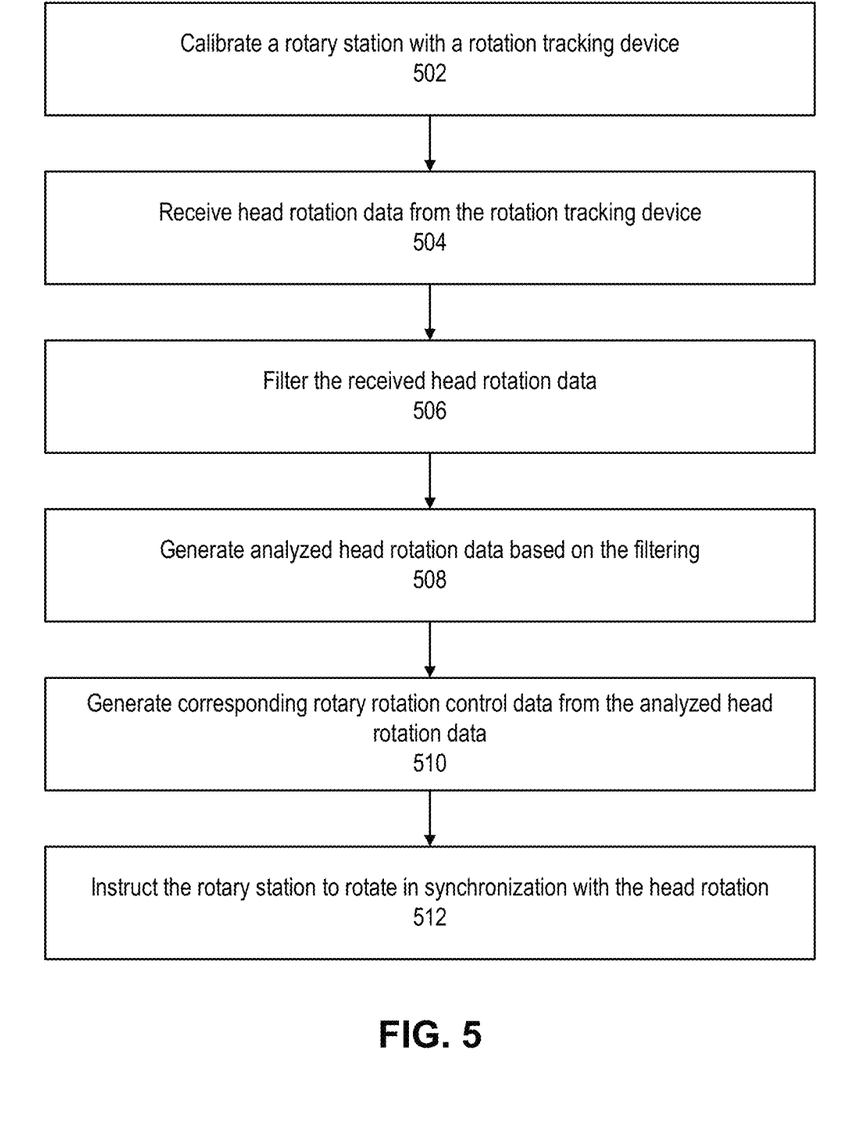
FIG. 5 is a flow chart illustrating a process for synchronizing rotations of a video capturing device (e.g., a mobile phone) mounted on a rotary station with head rotations of a user in connection with the user watching a sports event, according to one embodiment.

Example Method for Synchronizing a Video Capturing Device with Head Rotation of a User FIG. 5 is a flow chart illustrating a process for synchronizing rotations of a video capturing device (e.g., the video capturing device 106 shown in FIG. 1) mounted on a rotary station (e.g., the rotary station 130 shown in FIG. 1) with head rotation movement of a user (e.g., the user 102 shown in FIG. 1) in connection with the user watching a sports event, according to one embodiment. Initially, the video highlight tracking system 200 calibrates 502 the rotation tracking device 210 worn by the user with the rotary system 224. The calibration process sets the two boundaries defining the workspace of an end effector of the rotary system 224. The end effector mounts a video capturing device (e.g., a digital camera) onto the rotary system 224 for capturing a video clip of the sports event. The rotation tracking device 210 tracks the head movement of the user (e.g., yaw rotations) during the viewing of the sports event. The video highlight tracking system 200 receives 504 the head rotation data from the rotation tracking device 210 and filters 506 noise motions (e.g., motions from the user chewing gum, shaking his/her legs while watching the sports event) from the head rotation data (e.g., by using a fixed length sliding window buffer). The video highlight tracking system 200 generates 508 the analyzed head rotation data, which accurately describes the head movement of the user in a data structure. The video highlight tracking system 200 generates 510 corresponding rotary control data based on the analyzed head rotation data. The rotary control data includes instructions 512, when executed by the rotary system 224, to cause the rotary system 224 to rotate the video capturing device mounted onto the rotary system to synchronously follow the head rotations of the user.

The solution provided by the embodiments of the disclosure enables a user to enjoy a sports event while being capable of conveniently recording one or more video clips of the event. The user uses a remote controller to activate the video capturing device mounted on the rotary station to capture a video clip of the sports event, which is of interest to the user. With the rotation tracking device tracking the head movement of the user, the video capturing device mounted on the rotary station keeps following the view of the user during the whole sports event. The captured video of the sports event is analyzed to identify one or more video highlights in the sports event. The user is free from constantly checking whether the video capturing device captures what he/she wants; instead, the user can focus on the sports event and enjoy it.

General

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosed may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A computer-implemented method, the method comprising:
   receiving head rotation data of a user in connection with watching an event from a rotation tracking device worn by the user;
   filtering the head rotation data to generate filtered head rotation data by:
      storing the head rotation data in a sliding window buffer of a predetermined length,
      determining at least one varying pattern of the head rotation data at each sampling point, and
      generating a filtered head rotation data for each sampling point;
   generating corresponding rotary control data based on the filtered head rotation data; and
   instructing a rotary system to rotate synchronously with head rotations of the user based on the rotary control data.

2. The method of claim 1, further comprising:
   calibrating the rotary system with the rotation tracking device worn by the user, wherein the rotary system and the rotation tracking device are in two different coordinate systems.

3. The method of claim 2, wherein the calibrating comprises:
   determining a plurality of boundaries of a workspace of the rotary system, a boundary of the workspace of the rotary system describing a limit of rotation which can be performed by the rotary system; and
   adjusting the determined boundaries of the workspace of the rotary system based on a calibrating point defined by the rotation tracking device.

4. The method of claim 1, wherein generating the filtered head rotation data for each sampling point comprises:
   responsive to the determined varying pattern at a sampling point being linear, applying a linear regression process to the head rotation data; and
   generating the filtered head rotation data for the sampling point based on the linear regression.

5. The method of claim 1, wherein generating the filtered head rotation data for each sampling point further comprises:
   responsive to the determined varying pattern at a sampling point being nonlinear, calculating a median of the head rotation data stored in the sliding window buffer; and
   generating the filtered head rotation data for the sampling point based on the median of the head rotation data.

6. The method of claim 1, wherein generating corresponding rotary control data comprises:
   calculating amount of rotation and direction of the rotation for each rotation point based on the head rotation data corresponding to each rotation point; and
   generating a plurality of rotary rotation commands for each rotation point, a rotary rotation command including information of amount of rotation and direction of the rotation to be performed by the rotary system.

7. The method of claim 1, further comprising:
   receiving rotary rotation feedback data from the rotary system for each rotation point, the rotary rotation feedback data for each rotation point comprising information describing actual amount of rotation and direction of rotation performed by the rotary system; and
   generating rotary control data for a next rotation point based on the received rotary rotation feedback data for a current rotation point.

8. The method of claim 1, wherein instructing the rotary system to rotate synchronously with the head rotations of the user comprises:
   instructing the rotary system to follow the head rotation of the user at each corresponding rotation point in a same direction and by a same amount of rotation within boundaries of a workspace of the rotary system.

9. The method of claim 1, further comprising:
   receiving instructions from the user to activate a video capturing device mounted unto the rotary system for capturing a video clip of the event; and
   instructing the rotary system to follow the head rotations of the user when capturing the video clip.

10. A non-transitory computer-readable storage medium storing executable computer program instruction, the instructions when executed by a computer processor cause the computer processor to:
    receive head rotation data of a user in connection with watching an event from a rotation tracking device worn by the user;
    filter the head rotation data to generate filtered head rotation data by:
       storing the head rotation data in a sliding window buffer of a predetermined length,
       determine at least one varying pattern of the head rotation data at each sampling point, and
       generate a filtered head rotation data for each sampling point;
    generate corresponding rotary control data based on the filtered head rotation data; and
    instruct a rotary system to rotate synchronously with head rotations of the user based on the rotary control data.

11. The non-transitory computer-readable storage medium of claim 10, further comprising computer programs instructions, when executed by the computer processor, that cause the computer processor to:
    calibrate the rotary system with the rotation tracking device worn by the user, wherein the rotary system and the rotation tracking device are in two different coordinate systems.

12. The non-transitory computer-readable storage medium of claim 11, wherein the instructions for calibrating the rotary system with the rotation tracking device comprise instructions, when executed by the computer processor, that cause the computer processor to:
    determine a plurality of boundaries of a workspace of the rotary system, a boundary of the workspace of the rotary system describing a limit of rotation which can be performed by the rotary system; and
    adjust the determined boundaries of the workspace of the rotary system based on a calibrating point defined by the rotation tracking device.

13. The non-transitory computer-readable storage medium of claim 10, wherein the instructions for generating the filtered head rotation data for each sampling point comprise instructions, when executed by the processor, that cause the computer processor to:
    responsive to the determined varying pattern at a sampling point being linear, apply a linear regression process to the head rotation data; and
    generate the filtered head rotation data for the sampling point based on the linear regression.

14. The non-transitory computer-readable storage medium of claim 10, wherein the instructions for generating the filtered head rotation data for each sampling point further comprise instructions, when executed by the processor, that cause the computer processor to:
    responsive to the determined varying pattern at a sampling point being nonlinear, calculate a median of the head rotation data stored in the sliding window buffer; and
    generate the filtered head rotation data for the sampling point based on the median of the head rotation data.

15. The non-transitory computer-readable storage medium of claim 10, wherein the instructions for generating corresponding rotary control data comprise instructions, when executed by the computer processor, that cause the computer processor to:
    calculate amount of rotation and direction of the rotation for each rotation point based on the head rotation data corresponding to each rotation point; and
    generate a plurality of rotary rotation commands for each rotation point, a rotary rotation command including information of amount of rotation and direction of the rotation to be performed by the rotary system.

16. The non-transitory computer-readable storage medium of claim 10, further comprising computer program instructions, when executed by the computer processor, that cause the computer processor to:
    receive rotary rotation feedback data from the rotary system for each rotation point, the rotary rotation feedback data for each rotation point comprising information describing actual amount of rotation and direction of rotation performed by the rotary system; and
    generate rotary control data for a next rotation point based on the received rotary rotation feedback data for a current rotation point.

17. The non-transitory computer-readable storage medium of claim 10, wherein the instructions for instructing the rotary system to rotate synchronously with the head rotations of the user comprise instructions, when executed by the computer processor, that cause the computer processor to:
    instruct the rotary system to follow the head rotation of the user at each corresponding rotation point in a same direction and by a same amount of rotation within boundaries of a workspace of the rotary system.

18. The non-transitory computer-readable storage medium of claim 10, further comprising computer program instructions, when executed by the computer processor, that cause the computer processor to:
    receive instructions from the user to activate a video capturing device mounted unto the rotary system for capturing a video clip of the event; and
    instruct the rotary system to follow the head rotations of the user when capturing the video clip.

19. A computer system, comprising:
    a rotation tracking device configured to track head rotation movement of a user in connection with the user watching an event, the rotation tracking device worn by the user on a part of the user's head; and
    a rotary station configured to communicatively couple with the rotation tracking device, the rotary station comprising:
        a control module configured to analyze the tracked head rotation movement of the user and to generate rotary control data based on the analyzed head rotation movement of the user by:
            storing head rotation data representing the head rotation movement of the user in a sliding window buffer of a predetermined length,
            determining at least one varying pattern of the head rotation data at each sampling point, and
            generating a filtered head rotation data for each sampling point; and
        a rotary system configured to rotate a video capturing device synchronously with head rotations of the user based on the rotary control data.

20. The computer system of claim 19, wherein the control module is further configured to:
    calibrate the rotary system with the rotation tracking device worn by the user, wherein the rotary system and the rotation tracking device are in two different coordinate systems.

21. The computer system of claim 20, wherein calibrating the rotary system comprises:
    determining a plurality of boundaries of a workspace of the rotary system, a boundary of the workspace of the rotary system describing a limit of rotation which can be performed by the rotary system; and
    adjusting the determined boundaries of the workspace of the rotary system based on a calibrating point defined by the rotation tracking device.

22. The computer system of claim 19, wherein generating rotary control data comprises:
    calculating amount of rotation and direction of the rotation for each rotation point based on the head rotation data corresponding to each rotation point; and
    generating a plurality of rotary rotation commands for each rotation point, a rotary rotation command including information of amount of rotation and direction of the rotation to be performed by the rotary system.

23. The computer system of claim 19, wherein the control module is further configured to:
    receive rotary rotation feedback data from the rotary system for each rotation point, the rotary rotation feedback data for each rotation point comprising information describing actual amount of rotation and direction of rotation performed by the rotary system; and
    generate rotary control data for a next rotation point based on the received rotary rotation feedback data for a current rotation point.

24. The computer system of claim 19, further comprising:
a remote controller used by the user to control the video capturing device connected to the rotary system for capturing one or more videos of the event.

* * * * *